United States Patent [19]
Hughes

[11] 4,066,023
[45] Jan. 3, 1978

[54] COPY MACHINE TABLE

[76] Inventor: Kingdon R. Hughes, P.O. Box 2424, Midland, Tex. 79701

[21] Appl. No.: 761,805

[22] Filed: Jan. 24, 1977

[51] Int. Cl.² .............................................. A47B 37/00
[52] U.S. Cl. ...................................... 108/50; 108/69; 108/78
[58] Field of Search ................. 108/69, 78, 80, 77, 108/50, 91, 135; 312/280, 281, 207; 355/3 R, 75

[56] References Cited
U.S. PATENT DOCUMENTS

| | | | |
|---|---|---|---|
| 2,043,797 | 6/1936 | Horn | 108/78 X |
| 2,233,003 | 2/1941 | Epps | 312/277 X |
| 2,750,243 | 6/1956 | Zielfeldt | 108/78 |
| 2,993,740 | 7/1961 | Good | 108/80 |
| 3,294,412 | 12/1966 | Good | 312/208 X |
| 3,597,074 | 8/1971 | Murgas | 355/75 X |
| 3,669,536 | 6/1972 | Scott | 355/75 X |
| 3,672,312 | 6/1972 | Pettit | 108/69 |
| 3,695,754 | 10/1972 | Washio | 355/3 R |
| 3,912,389 | 10/1975 | Miyamoto | 355/75 X |

*Primary Examiner*—Francis K. Zugel
*Attorney, Agent, or Firm*—Wendell Coffee

[57] ABSTRACT

A framework contains a copy machine having a transparent platen on its rectangular top surface, and an ejection slot and access door on sides below the top surface. Three planar leaves are attached to the framework such that they may be moved either to a horizontal position coplanar with the transparent platen or to a vertical position proximate the framework. When in the raised horizontal position, the leaves provide a large surface which facilitates copying large sheets or plats. An aperture within a planar leaf and adjustments in the framework provide access to the sides of the copy machine for operational purposes.

13 Claims, 6 Drawing Figures

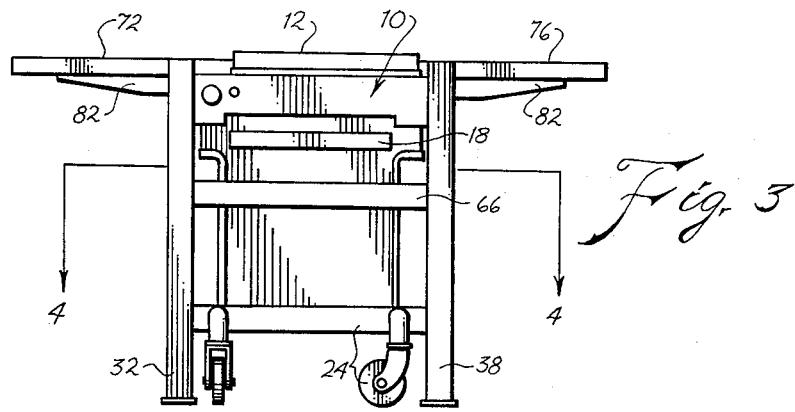
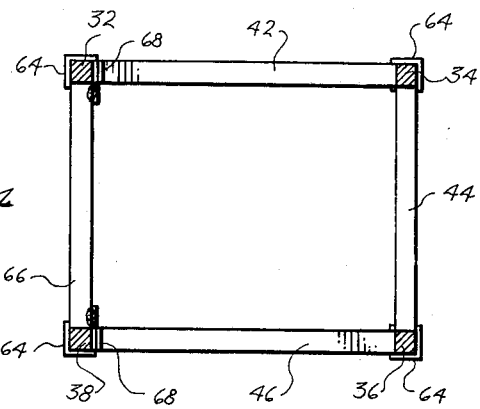
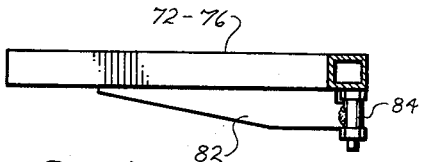
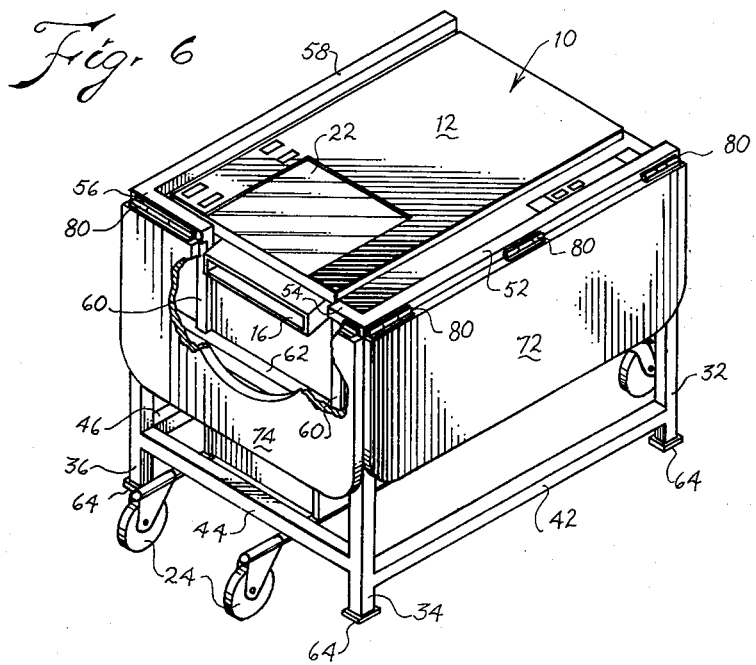

COPY MACHINE TABLE

BACKGROUND OF THE INVENTION

1. Field of the Invention

This invention relates to office equipment tables with coplanar plural related horizontal surfaces, and more particularly to such stands with end drop leaves for use with copying machines.

2. Description of the Prior Art

Before my invention, tables for office machines were welll known. However, these tables were not suited nor adaptable to use with office copying machines because of the size, height and peculiar shape of office copying machines.

The following examples of the prior art were known to me before the filing of this application:
Pettit, U.S. Pat. No. 3,672,312
Good, U.S. Pat. No. 3,294,412
Good, U.S. Pat. No. 2,993,740

SUMMARY OF THE INVENTION

New and Different Function

Before my invention, it was impractical to copy specific portions of large maps, surveys, blueprints, or plats on a standard office copying machine because the surface of most copying machines was insufficient to permit such large sheets being copied to be spread out. Consequently, the sheet had to be folded, or allowed to drape over the edge of the copy machine. In either case damage such as tearing or creasing frequently occurred to the sheet, eventually necessitating costly replacement.

Because of the impracticality of copying such sheets on private office copiers, the maps or surveys had to be sent to a map reproduction company for copying various parts of the sheets at great expense and time. In many cases, the maps or surveys contained trade secrets the disclosure of which would be prejudicial. The practical problems of security involved in sending sheets out to independent map reproduction companies are manifest.

My invention obviates the need to send such sheets outside the office for reproducing small portions thereof by allowing the use of the office copying machine for such purposes, thereby increasing efficiency and economy. I have greatly increased the surface area coplanar with the transparent platen of the copying machine by inventing a table to contain the copying machine with special end drop leaves. With the leaves up, large sheets may now be placed, copied, and adjusted without fear of damage to such valuable documents. By providing apertures in the leaves to enable operation of the copy machine with the leaves "down," I have invented a flexible copy machine accessory that occupies no more space than did the original copier in normal use, but is easily transformed into the desired form necessary for copying large sheets. Therefore it may readily be seen that my invention enhances the utility and economy of an office copying machine far in excess of its capability without my invention.

Thus in combination, the table has far greater function than the sum of the individual leaves, legs, etc.

Objects of this Invention

An object of this invention is to aid in copying portions of large sheets or plats.

Further objects are to achieve the above with a device that is sturdy, compact, durable, lightweight, simple, safe, efficient, versatile, energy conserving, and reliable, yet inexpensive and easy to manufacture, install, adjust, operate, and maintain.

The specific nature of the invention, as well as other objects, uses, and advantages thereof, will clearly appear from the following description and from the accompanying drawing, the different views of which are not to the same scale.

BRIEF DESCRIPTION OF THE DRAWING

FIG. 3 is a front elevational view thereof with the leaves up.

FIG. 4 is a top sectional view of the same embodiment taken substantially on line 4—4 of FIG. 3 without the copy machine.

FIG. 5 is a magnified view of the movable brace and brace hinges.

FIG. 6 is a perspective view thereof with the leaves down.

DESCRIPTION OF THE PREFERRED EMBODIMENT

Figure 1:
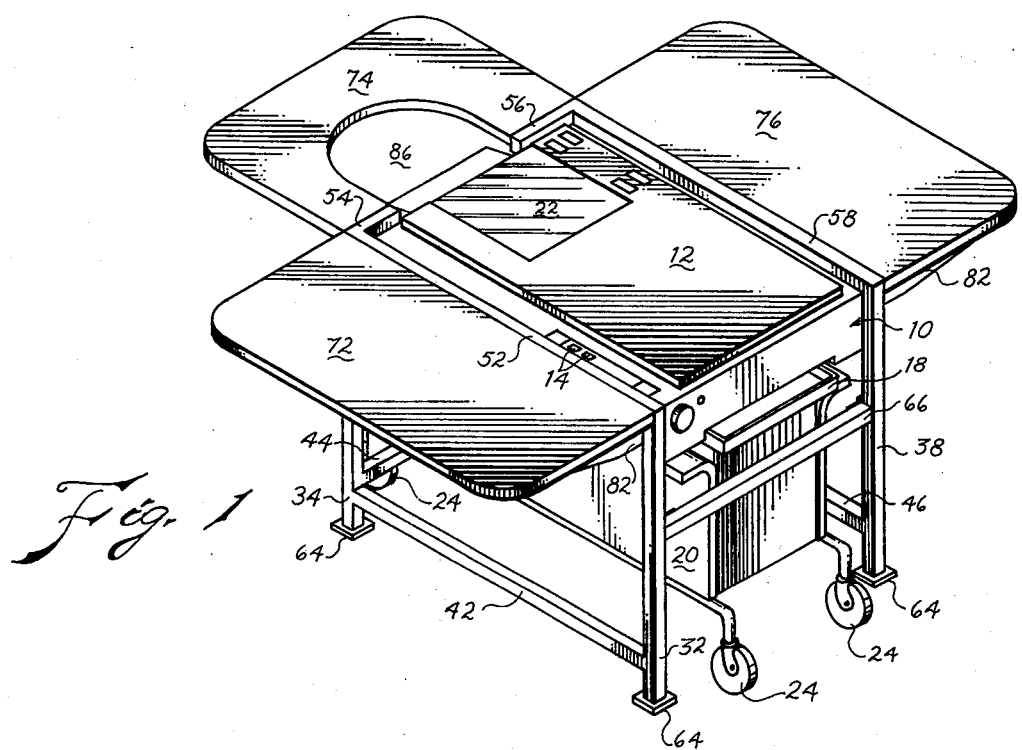
FIG. 1 is a perspective view of a copy machine and an embodiment of my invention with the leaves up.

An office copy machine as used herein includes copy machine 10 with rectangular top surface 12, control buttons 14 on the top surface 12, and ejection slot 16, paper feed slot 18, and access or storage door 20 on the side below the top surface 12. For use with my invention, the platen cover of the copy machine must be removed, exposing transparent platen 22, which is coplanar with top surface 12. The copy machine 10 is supported by base 24 on a floor.

Because each different brand of copy machines having a transparent platen on their top surfaces has its own peculiar shape, size, placement of controls, ejection slots, input slots, and access doors, and height, this embodiment of my invention is necessarily adapted to a particular copier, in this case a Xerox 3100 copier. It should be noted my invention is applicable to a great number of copiers of different types and that this embodiment is an adaptation of my invention to a particular copier.

The framework of the copy machine stand in this embodiment has four legs 32, 34, 36, and 38, which are interconnected by bottom braces 42, 44, and 46. It may be seen that the copier is rectangular and that the inside dimensions of the framework conform to those of the outside of the copier. Top braces 52, 54, 56, and 58, are attached to the uppermost point on the legs and on the uppermost point of flat braces 60. Middle brace 62 connects the legs 34 and 36 and is lower than the ejection slot 16, as shown in FIG. 6. Flat braces 60 are on either side of the ejection slot 16 and connect the middle brace 62 with the ends of the top braces 54 and 56. The other ends of the top braces 54 and 56 are connected to the legs 34 and 36 respectively. Both ends of the top braces 52 and 58 are connected to the legs 32 and 34, and legs 36 and 38, respectively. Feet 64 are attached to the end of the legs on the floor. I prefer to weld the above frame members together because of the rigidity and strength of such construction. Removable brace 66 is connected to the legs 32 and 38 by open bar latches 68. The open bar latches 68 allow the removable brace 66 to be removed or connected to the framework to allow the removal or retention of the copy machine 10 within the framework.

Planar leaves 72, 74, and 76 are attached to the top braces 52, 54, 56, and 58, respectively, by leaf hinges 80. By referring to FIG. 3, it may be seen that the leaf hinges are positioned such that the planar leaves 72, 74, and 76 may be raised to a horizontal position coplanar with the transparent platen 22. The leaf hinges 80 also allow the planar leaves to be lowered to a vertical position proximate the legs, as shown in FIG. 6. I prefer to weld the leaf hinges to the top braces, and to screw the leaf hinges to the planar leaves. I also find it advantageous to place "Formica" on the surface and edges of the leaves to make them smoother and more durable.

Movable braces 82 are attached to the top braces by vertically aligned brace hinges 84, as shown in FIG. 5. The brace hinges 84 permit the movable braces 82 to be moved from a position proximate the top braces, called the "closed" position, to a position approximately perpendicular to the top braces, called the "open" position. It may readily be seen that when in the open position, the movable braces 82 support the planar leaves in the horizontal position. When in the closed position, the movable braces 82 no longer project from the framework and hence permit the planar leaves to be lowered to the vertical position.

Figure 2:
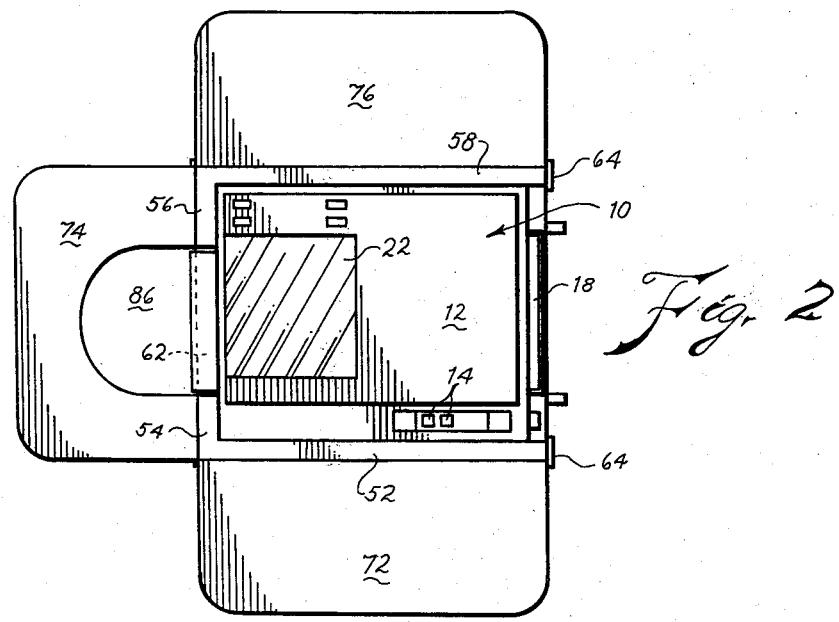
FIG. 2 is a top plan view thereof with the leaves up.

In order to best utilize my invention, I have found that the most usable surface area is available when the copy machine is placed within the framework such that the transparent platen 22 is adjacent to the planar leaf 74, as shown in FIG. 2. In this position, the side of the table without a leaf is the side most distal of the transparent platen 22.

Depending on the orientation of the copy machine 10 within the framework, an aperture or apertures in one or more of the planar leaves may be necessary to allow access to the operational portions of the copy machine when the planar leaves are in the lowered vertical position. Because I prefer the orientation stated above, ejection aperture 86 with the planar leaf 74 is necessary to allow access to the ejection slot 16. It may be seen that the ejection aperture 86 is wider than ejection slot 86 and of such a depth when the planar leaf 74 is in the vertical position that it is closer to the floor or lower than the bottom of the ejection slot 16. It may also be seen that when the planar leaf 74 is in the horizontal position, the ejection aperture 86 is of sufficient size to allow access to the ejection slot 16.

An additional adjustment may be necessary in the framework members to allow access doors in the copy machine to be opened. The orientation of the copy machine I prefer necessitates that the bottom brace 42 be lower than is the access door 20 to allow the access door to be opened.

A gap between the top braces 54 and 56 is necessitated by the orientation of the copier to provide access to the ejection slot.

From the foregoing, it may readily be seen that the copy table permits copying of large sheets when the planar leaves are raised, and allows normal day-to-day use when the planar leaves are lowered. In addition, the copy machine may be easily removed from the table for service or transport to other work areas.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

10 copy machine
12 top surface
14 control buttons, top
16 ejection slot
18 paper feed slot
20 access door
22 transparent platen
24 copy machine base
32 leg
34 leg
36 leg
38 leg
42 bottom brace
44 bottom brace
46 bottom brace
52 top brace
54 top brace
56 top brace
58 top brace
60 flat braces
62 middle brace
64 feet
66 removable brace
68 open bar latches
72 planar leaf
74 planar leaf
76 planar leaf
80 leaf hinges
82 movable braces
84 brace hinges
86 ejection aperture

I claim as my invention:

1. A table adapted for use with a copy machine, said copy machine having
   a. a rectangular top surface,
   b. a transparent platen on said top surface,
   c. an ejection slot for ejecting copies in a side below said top surface,
   d. a paper input slot for injecting paper in a side below said top surface,
   e. an access door in a side below said top surface, and
   f. a base supporting said copy machine on the floor;
the improved table comprising in combination with the above:
   g. a framework on said floor,
   h. at least two planar leaves,
   j. said copy machine within said framework,
   k. leaf hinges attached to each planar leaf,
   m. said leaf hinges securing each of said planar leaves to the framework in a horizontal position with at least one side of each of said planar leaves adjacent to at least one side of the copy machine within said framework, and n. said leaf hinges also securing each of said planar leaves to the framework in a horizontal position with the upper surfaces of said planar leaves coplanar with the transparent platen of said copy machine as defined above, o. said leaf hinges further forming means for securing said planar leaves to the framework so that leaves may be folded to a vertical position proximate said framework, p. Said framework having four legs, q. said legs rigidly connect together on three sides of said copy machine, r. said framework having at least two top braces connected to the top of said legs, s. said leaves being connected to said top braces by said hinges, t. said framework having a middle brace connecting two legs below the tops thereof, u. said middle brace being below said rejection slot.

2. The invention as defined in claim 1 with additional limitations of r. said planar leaves being three in number, s. each of said planar leaves having one side adjacent to said copy machine within said framework.

3. The invention as defined in claim 2 with additional limitations of t. movable braces being attached to said framework, u. said movable braces forming means for rigidly securing said planar leaves in the horizontal position.

4. The invention as defined in claim 1 with additional limitations of r. at least one of said planar leaves having at least one aperture therein, s. said aperture forming means of access to said copy machine sides for operational purposes when said planar leaves are in the horizontal or the vertical position.

5. The invention as defined in claim 4 with additional limitations of t. said planar leaves being three in number, u. each of said planar leaves having one side adjacent to said copy machine within said framework.

6. The invention as defined in claim 5 with an additional limitation of v. said copy machine having said planar leaves adjacent to each side of said copy machine within said framework with exception of a side most distal of said transparent platen.

7. The invention as defined in claim 5 with additional limitations of v. movable braces being attached to said framework, w. said movable braces forming means for rigidly securing said planar leaves in the horizontal position.

8. The invention as defined in claim 7 with additional limitations of x. said planar leaf adjacent to a side of the copy machine with said ejection slot having an ejection aperture, y. said ejection aperture providing means for access to the ejection slot while the planar leaf with said ejection aperture is in the vertical position and the horizontal position.

9. The invention as defined in claim 3 with additional limitations of jj. said movable braces being rigid ontriggers, kk. said movable braces being attached to the top braces by vertically aligned brace hinges, mm. said brace hinges providing means for securing said movable braces in a closed position proximate the top braces, nn. said brace hinges also providing means for securing said movable braces in an open position perpendicular said top braces.

10. The invention as defined in claim 1 with additional limitations of jj. said framework having a removable brace, kk. said removable brace connecting the two legs on the side of said framework not having a bottom brace, mm. said removable brace providing means for retaining said copy machine within said framework, nn. said removable brace being disconnectable from said framework.

11. The invention as defined in claim 10 with additional limitations of oo. said removable brace having an open bar latch at each end, pp. said open bar latches providing means for securing said removable brace to said framework, qq. said open bar latches also providing means for removing said removable brace from said framework.

12. The invention as defined in claim 1 with additional limitations of nn. said framework having two flat braces, oo. said flat braces connecting said middle brace to the top braces adjacent the planar leaf with the aperture therein, pp. said framework having a gap between said top braces adjacent the planar leaf with the aperture, said gap providing means of access to the ejection slot and transparent platen.

13. The invention as defined in claim 1 with additional limitations of jj. one of said bottom braces adjacent to a side of said copy machine having said access door being lower than the bottom of the access door, kk. said lower bottom brace providing means of access to said access door.

* * * * *